United States Patent [19]
Tousignant

[11] Patent Number: 6,144,903
[45] Date of Patent: Nov. 7, 2000

[54] ELECTRICAL FAULT RECOGNITION SYSTEM FOR VEHICLES

[75] Inventor: Alan E. Tousignant, Clinton Township, Mich.

[73] Assignee: Meritor Heavy Vehicle Systems, LLC, Troy, Mich.

[21] Appl. No.: 09/128,514

[22] Filed: Aug. 3, 1998

[51] Int. Cl.[7] ............................. G06F 7/00; G01M 17/00
[52] U.S. Cl. ........................ 701/29; 701/31; 701/34; 340/636; 714/14
[58] Field of Search ...................... 701/29, 31, 34, 701/33; 361/86, 96, 18, 90, 78; 324/522, 771, 429; 714/14, 22; 320/136; 340/636, 459, 693.1

[56] References Cited

U.S. PATENT DOCUMENTS

| | | |
|---|---|---|
| 4,667,176 | 5/1987 | Matsuda ................................. 340/459 |
| 4,707,758 | 11/1987 | Matsuda .................................. 361/18 |
| 5,005,129 | 4/1991 | Abe et al. ................................ 701/29 |
| 5,159,272 | 10/1992 | Rao et al. .............................. 324/429 |
| 5,172,062 | 12/1992 | Eisermann ............................. 324/503 |
| 5,176,429 | 1/1993 | Junichi et al. .......................... 303/92 |
| 5,530,360 | 6/1996 | Kerchaert et al. ..................... 324/379 |
| 5,532,927 | 7/1996 | Pink et al. ............................... 701/29 |
| 5,637,933 | 6/1997 | Rawlings et al. ...................... 307/147 |
| 5,739,676 | 4/1998 | Judge et al. ............................ 322/22 |

*Primary Examiner*—Jacques H. Louis-Jacques
*Attorney, Agent, or Firm*—Carlson, Gaskey & Olds

[57] ABSTRACT

An electrical fault recognition control is incorporated into a vehicle. The control includes a sensor which monitors the current and voltage draw from the battery, and identifies faults in the power draw. When a fault is detected, systems which are then actuated are identified and stored. By comparing the systems which are actuated over a plurality of anomalies, the control is able to identify which system is likely to be failing. A signal may then be sent to the operator.

5 Claims, 1 Drawing Sheet

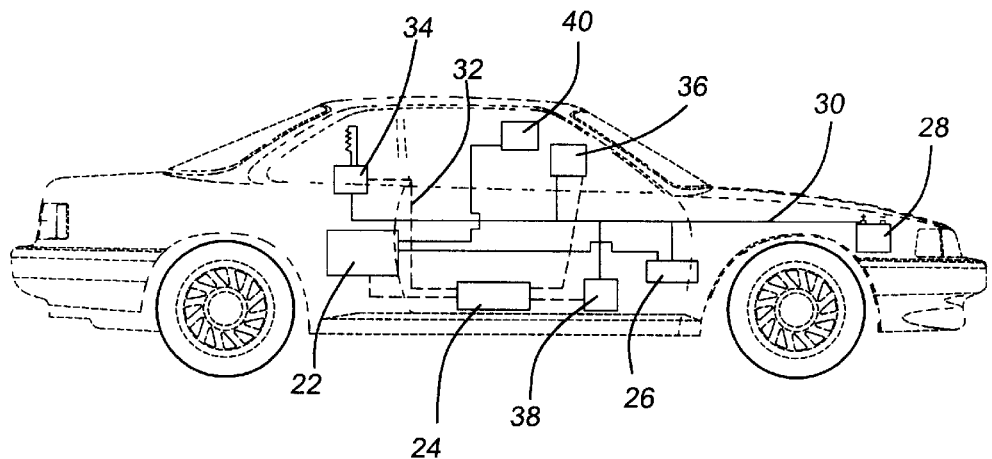
*Fig-1*
| | FAULT? | REAR DEFOG ON? | BRAKE ON? | RADIO ON? |
|---|---|---|---|---|
| 1 | YES | YES | YES | YES |
| 2 | YES | NO | YES | YES |
| 3 | YES | NO | YES | YES |
*Fig-2*
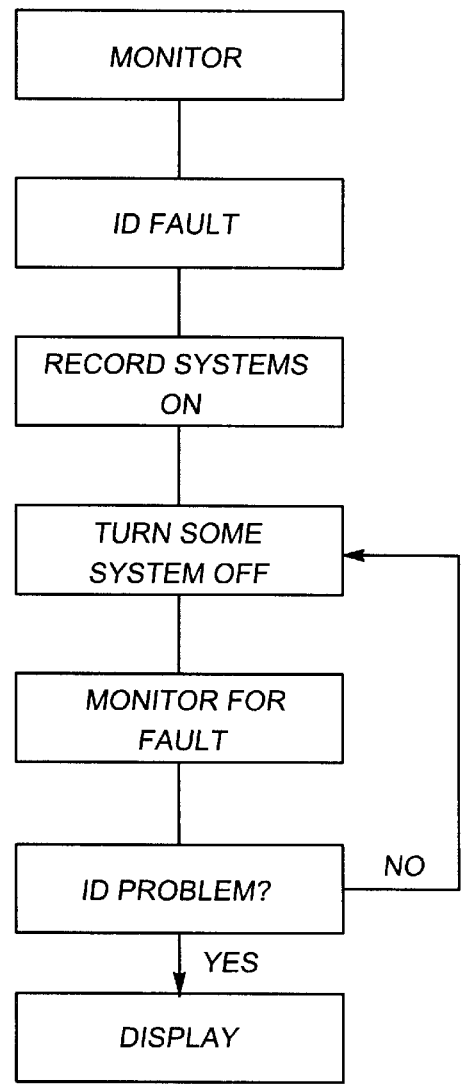
*Fig-3*

ELECTRICAL FAULT RECOGNITION SYSTEM FOR VEHICLES

BACKGROUND OF THE INVENTION

This invention relates to a system for identifying electrical faults in a vehicle power supply, and to identify a failing system based upon the identified electrical faults.

Vehicles are being provided with more and more electrically controlled components each year. As an example, entertainment systems and driver information systems such as navigation systems are becoming widely utilized. Moreover, traditional vehicle systems such as brakes, and even steering are becoming electrically controlled.

The electrically controlled systems are typically controlled on a single computer busline. With the addition of more and more electrical systems to the vehicle, there are more signals passing over the data busline.

While electrically controlled systems are beneficial for many reasons, the electrical systems are all subject to failure. Such systems may thus fail, and it would be desirable to provide a simple way of detecting the failure of any one system. The use of a common busline does make it difficult to identify which system is failing.

SUMMARY OF THE INVENTION

In a disclosed embodiment of this invention, a method and system is provided wherein power passing from the vehicle battery to the various components on the vehicle is monitored. Further, the components which are actuated at any one time are monitored. If a power fault (i.e., a surge or drop in the voltage or current) is detected, a control system identifies which systems are on at that time. By monitoring this information over a period of time, the control is able to make a prediction of when a particular system is failing.

Moreover, this system is preferably provided with a diagnostic mode. In the diagnostic mode, if a number of systems are on when a power fault is detected, those systems are turned off one by one until the power system is identified.

The inventive method thus provides a very efficient and cost effective way of identifying failing systems by monitoring the electrical characteristics of the vehicle.

These and other features of the present invention can be best understood from the following specification and drawings, the following of which is a brief description.

BRIEF DESCRIPTION OF THE DRAWINGS

FIG. 1 is a schematic view of a vehicle incorporating the present invention.

FIG. 2 is a table of monitored bits of information.

FIG. 3 is a flow chart of the inventive method.

DETAILED DESCRIPTION OF A PREFERRED EMBODIMENT

A vehicle 20 shown in FIG. 1 is equipped with the inventive system. A control 22 is operable to monitor electrical signals, and identify which of the several electrically controlled systems may be failing. Control 22 communicates with the vehicle computer 24, and also with a power sensor 26. Power sensor 26 is associated with a battery 28, and monitors the power supply lines 30 leading from the battery to the vehicle components. Power sensor 26 is able to identify the actual current and voltage draw from the battery, and send a signal representative of the current and voltage draw to the control 22.

In addition, a number of control lines 32 deliver control signals from the computer 24 to several systems on the vehicle. Computer 24 receives input signals from operator switches, or sensors which activate a particular system, and sends control signals to activate the systems on the vehicle. This is all as known in the prior art.

For purposes of illustration, FIG. 1 shows a rear defogger 34, an entertainment system such as a radio 36, and an electronically controlled anti-lock brake system 38. Each of these systems draws power from the battery 28, and is controlled by the computer 24 over the control line 32. It should be understood that in practice many more systems would be included. The few illustrated systems are shown merely to explain the invention.

Computer 34 sends a signal to the control 22 of which systems are actuated at any one time. The sensor 26 sends a signal of the current and power at any one time. Given the systems which are on, control 22 is programmed with information of what the current and voltage should be. If the actual monitored current and voltage draw is different from that which is expected given the systems which are on, then the control 22 identifies a fault. The control 22 identifies which systems are on when a fault is detected. A determination is then made that one of the actuated systems may be failing in some way. Control 22 records the failure and the systems which are on. Over a period of time control 22 is able to identify which system is failing.

As an example, FIG. 2 shows three situations wherein a power fault has been detected. In the first situation, rear defogger 34, brake system 38, and radio 36 are all on. In the second situation, the power fault is still experienced even though rear defogger 34 is off. Control 22 might then determine that it is unlikely rear defogger 34 is the source of the power fault. In the third situation, both rear defogger 34 and radio 36 are off and the power fault still exists. Only brake system 38 is on in this situation. The control 22 is then able to determine that perhaps the brakes are failing. A signal 40 is then given to the driver that there may be a fault. The signal 40 may be a reconfigurable display panel such that the driver is able to request which system is at fault, or it may be detailed enough that a particular signal is given for the particular system fault which has been detected.

Of course, there are hundreds of possible combinations of systems which possibly may need to be stored over time. In practice it is unlikely that only three electric systems will be actuated. However, the control 22 can monitor many cases of power faults in a relatively short period of time and get the above determination.

It may also be that different types of electrical anomalies monitored by the sensor 26 are associated with failings of particular systems. That is, a current draw which is higher than expected may be identified more with a failing rear defogger, than a radio. In this way, the control 22 may more quickly get to an identification of the particular failing system. These details will be worked out experimentally as systems under the present invention are developed.

FIG. 3 shows a flow chart for an improved embodiment of this invention wherein a diagnostic procedure is employed. FIG. 3 will be explained with repeated reference to FIG. 2. If it is assumed that the first signal of FIG. 2 is a monitored signal, then the second and third signals will be described as being associated with a diagnostic method.

As shown in the flow chart of FIG. 3, the system monitors the power draw. If a power fault (i.e., an anomaly in the current or voltage) is identified, then control 22 records the systems which are actuated.

The actuated systems may then be deactuated for diagnostic purposes. Obviously, systems which are important to safety features may not be deactivated; however, comfort type systems can be deactuated for a short period of time. Thus, as shown in FIG. 2, if the first reading shows that a power surge has occurred with rear defogger 34, brakes 38 and radio 36 on, then the diagnostic system may turn off rear defogger 34 momentarily and monitor whether the power surge is still occurring the next time the brakes 38 are actuated.

As shown in FIG. 2, the answer is yes. The diagnostic system may then turn off radio 36 and determine whether the power surge still occurs when the brakes 38 are on. If the answer is yes, then the same determination made previous with regard to the brakes perhaps failing can be made. By utilizing this diagnostic method, the control 22 can get to the answer much more quickly than if it were simply passively monitoring the actuations and eliminating systems as they can be eliminated with actuation of the several systems.

In fact, with the diagnostic method of FIG. 3, it may well be that in situation three of FIG. 2, the rear defogger is on and only the radio is turned off. However, those details are left again to the designer of the final systems.

Control 22 can be a separate computer, or incorporated into the main vehicle computer 34. Any components for identified, monitoring and storing can be used. A worker of ordinary skill in the art would recognize that many different combinations can be used.

A preferred embodiment of this invention has been disclosed; however, a worker of ordinary skill in this art would recognize that certain modifications would come within the scope of this invention. For that reason, the following claims should be studied to determine the true scope and content of this invention.

What is claimed is:

1. A method of determining a failing electrical system on a vehicle comprising the steps of:

(1) monitoring the power draw from the power supply of the vehicle to the several components;

(2) identifying a power fault in the power draw;

(3) identifying electrically controlled systems which are actuated when the power fault occurs;

(4) storing information with regard to the identified systems of step (3); and (5) determining a failing system by utilizing a series of fault readings, said determination including identifying which systems are actuated over said series of fault readings.

2. A method as recited in claim 1, wherein step (1) includes reading both the current and voltage draw.

3. A method as recited in claim 1, wherein a control utilizes a diagnostic method of eliminating which system may be failing when a fault is read, by turning off systems, and continuing to monitor for faults.

4. A control system for a vehicle comprising:

a plurality of electrical systems drawing power from a power source;

a power source supplying power to said systems;

a sensor for sensing the current and voltage draw from said power source;

a control for communicating with said sensor, said control receiving signals with regard to electrical systems which are actuated on the vehicle, and said control being operable to identify a fault from said sensor, and store information with regard to systems which are actuated when a fault occurs, said control being operable for monitoring at least a plurality of faults, and identifying a potentially failing system, said identification including indenting which systems are actuated over said plurality of faults.

5. A system as recited in claim 4, wherein said control is provided with a diagnostic method wherein when a fault is identified, systems which are actuated are turned off one by one to identify a failing system.

* * * * *